United States Patent [19]

Moyroud et al.

[11] Patent Number: 4,819,018
[45] Date of Patent: Apr. 4, 1989

[54] HIGH-SPEED BROAD-BRUSH LASER PHOTOCOMPOSITION

[76] Inventors: Louis M. Moyroud, 202 Grove Way, Delray Beach, Fla. 33444; Michel Moulin, CH 1143 Apples, Switzerland

[21] Appl. No.: 832,000

[22] Filed: Feb. 20, 1986

[30] Foreign Application Priority Data

Feb. 22, 1985 [GB] United Kingdom ................ 8504565
Dec. 12, 1985 [GB] United Kingdom ................ 8530597

[51] Int. Cl.$^4$ ........................ B41B 19/00; G01D 9/42
[52] U.S. Cl. ..................................... 354/5; 346/108; 371/1; 364/523
[58] Field of Search ........................ 354/4–7, 354/12; 346/107 R, 108, 76 L, 160; 364/523; 358/302; 371/1

[56] References Cited

U.S. PATENT DOCUMENTS

| | | |
|---|---|---|
| 3,517,592 | 6/1970 | Kollar . |
| 3,568,178 | 3/1971 | Day .................... 340/324 |
| 3,585,296 | 6/1971 | Martin . |
| 3,597,593 | 6/1971 | Overacker . |
| 3,626,459 | 12/1971 | Hoflinger et al. ........... 354/5 |
| 3,688,033 | 8/1972 | Hell et al. . |
| 3,692,935 | 9/1972 | Manber . |
| 3,721,991 | 3/1973 | Kaufman et al. .......... 354/5 X |
| 3,820,123 | 6/1974 | Ammann ................ 354/7 |
| 3,863,262 | 1/1975 | Crofut et al. ........... 354/5 |
| 3,952,311 | 4/1976 | Lapeyre ............... 354/5 |
| 4,000,495 | 12/1976 | Pirtle ................. 354/7 |
| 4,025,189 | 5/1977 | Pugsley .............. 358/302 |
| 4,044,363 | 8/1977 | Morgan ............... 354/5 |
| 4,067,021 | 1/1978 | Baylis et al. .......... 346/108 X |
| 4,096,486 | 6/1978 | Pfeifer et al. ......... 354/4 X |
| 4,277,154 | 7/1981 | Sakabinos ............ 354/5 |
| 4,279,483 | 7/1981 | England et al. ........ 354/5 |
| 4,310,226 | 1/1982 | Manber et al. ......... 354/5 |
| 4,316,196 | 2/1982 | Jacobs ................ 346/1.1 |

(list continued on next page.)

FOREIGN PATENT DOCUMENTS

| | | |
|---|---|---|
| 0075046 | of 0000 | European Pat. Off. . |
| 0056334 | 7/1982 | European Pat. Off. . |
| 097261 | 5/1983 | European Pat. Off. . |
| 3046397 | 7/1982 | Fed. Rep. of Germany . |
| 2374720 | 7/1978 | France . |
| 1201624 | 11/1967 | United Kingdom . |
| 2136733 | 3/1984 | United Kingdom . |

OTHER PUBLICATIONS

"Advances in Laser and E-O Printing Technology", Oct. 1983, vol. 19, Laser Focus/Electro-Optics, pp. 101–109.

(List continued on next page.)

Primary Examiner—W. B. Perkey
Attorney, Agent, or Firm—Curtis, Morris & Safford

[57] ABSTRACT

The machine preferably utilizes a laser whose light output, modulated to produce a plurality of beams which move simultaneously across a photosensitive surface, thus forming a "broad brush" laser beam. In one embodiment, the photosensitive material is in elongated sheet form and moves longitudinally while the broad brush laser moves continuously back and forth across the moving sheet. In another embodiment, the sheet material is wrapped around the surface of a drum and the drum rotates past the laser beam, while the laser beam moves either continuously or intermittently so that contiguous circumferential bands of composition are formed, filling the whole sheet of material with only one pass of the projection mechanism along the length of the drum. Means are provided for compensating for the simultaneous continuous motion of the broad brush and the photosensitive surface in order to produce straight lines of text composition which are perpendicular to the edges of the photosensitive surface. Each sweep of the laser beam is contiguous with the preceding sweep, and in each sweep each full character, or any part of a character, which falls within the sweep path is projected onto the photosensitive surface, thus further enhancing the speed of photocomposition. Characters and graphic matter preferably are stored in digital form by a raster image processor in order to enable this type of operation.

27 Claims, 11 Drawing Sheets

U.S. PATENT DOCUMENTS

| | | |
|---|---|---|
| 4,342,504 | 8/1982 | Ebner .................................. 354/7 |
| 4,344,677 | 8/1982 | Stuermer et al. ..................... 354/5 |
| 4,370,678 | 1/1983 | Kitamura ........................... 358/285 |
| 4,378,562 | 3/1983 | Oosaka et al. ................. 346/108 X |
| 4,394,076 | 7/1983 | Manber et al. ....................... 354/5 |
| 4,419,676 | 12/1983 | Lenk et al. ......................... 354/5 |
| 4,431,295 | 2/1984 | Moyroud et al. .................... 354/5 |
| 4,554,561 | 11/1985 | Daniele et al. ................... 346/108 |
| 4,563,747 | 1/1986 | Tidd ................................ 354/5 X |
| 4,591,880 | 5/1986 | Mitsuka ............................ 346/108 |
| 4,617,578 | 10/1986 | Nezu et al. ..................... 354/5 X |
| 4,746,942 | 5/1988 | Moulin ............................... 354/5 |

OTHER PUBLICATIONS

Patent Abstracts of Japan, vol. 7, No. 231, (p. 229 (1376), Oct. 13, 1983.

IBM Technical Disclosure Bulletin, vol. 13, No. 12, 5/19/71, (Optical Printer).

Taylor et al. (Ferroelectric Light Valve Arrays For Optical Memories), IEEE Trans Sonics and Ultrasonics, 1972 SU-19, pp. 81-99.

Tults, "A Facsimile Printer Utilizing an Array of Liquid Crystal Cells" Proceedings of the S.I.D., vol. 12/4, 4th Qtr. 1971, pp. 199-203.

G. Wessel, "Electro-Optical Ceramic (PLZT) as Light-Gate Array for Non-Impact Printer" Research CT STD Elektrik Lorenze W. Ger. Publ. Unk.

Cutchen et al., "PLZT Electrooptic Shutters": Applns., Applied Optics, vol. 14, 8/75, pp. 1866-1873.

Ueno et al., "PLZT Spatial Light Modulator for a 1-D Halogram Memory", Applied Optics, vol. 19, No. 1, 1/80, pp. 164-172.

Abstract of Japanese Patent Appln. No. 56-125,044, Suwa Seikosak.

Abstract of Japanese Patent Appln. No. 56-167,575, Kouichi Suzuki.

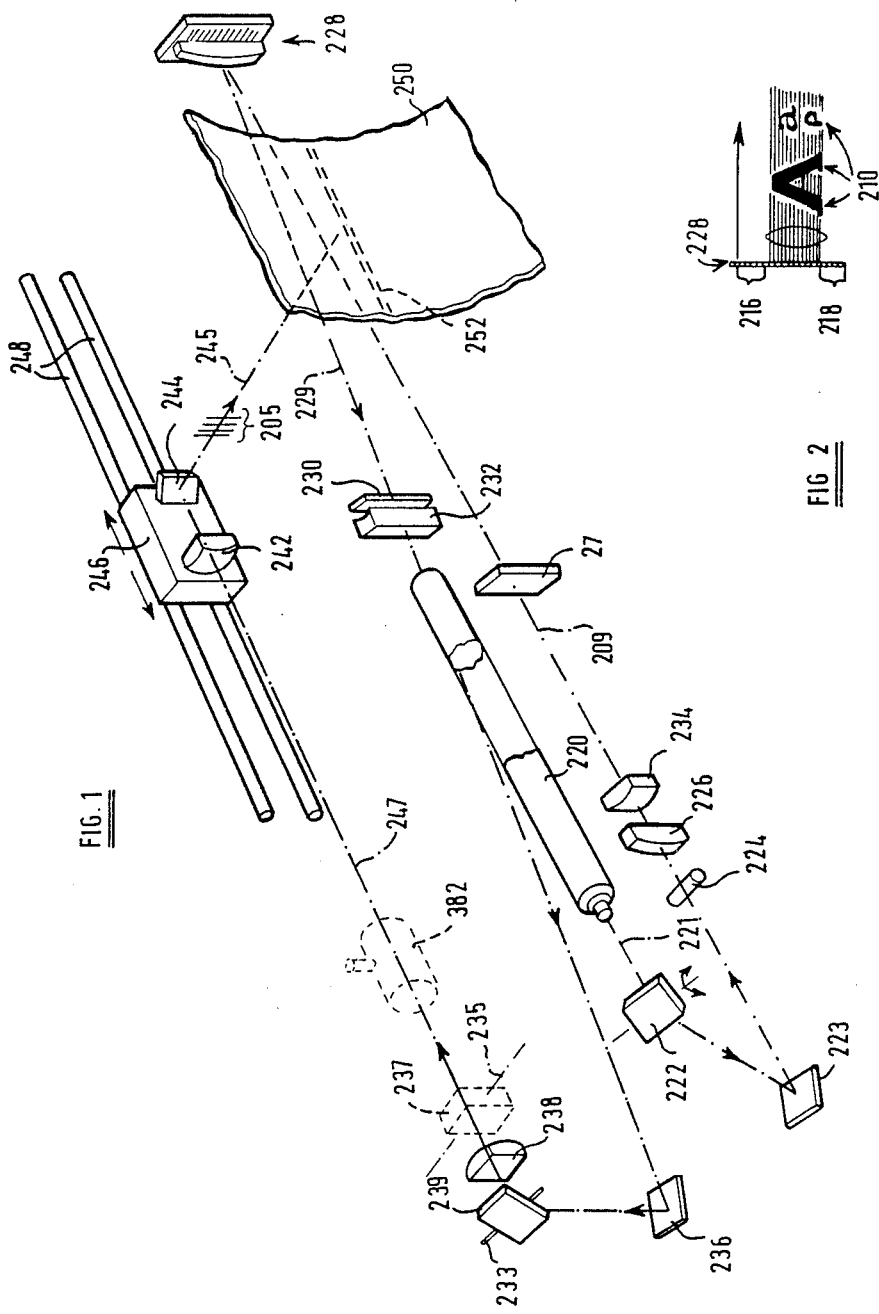

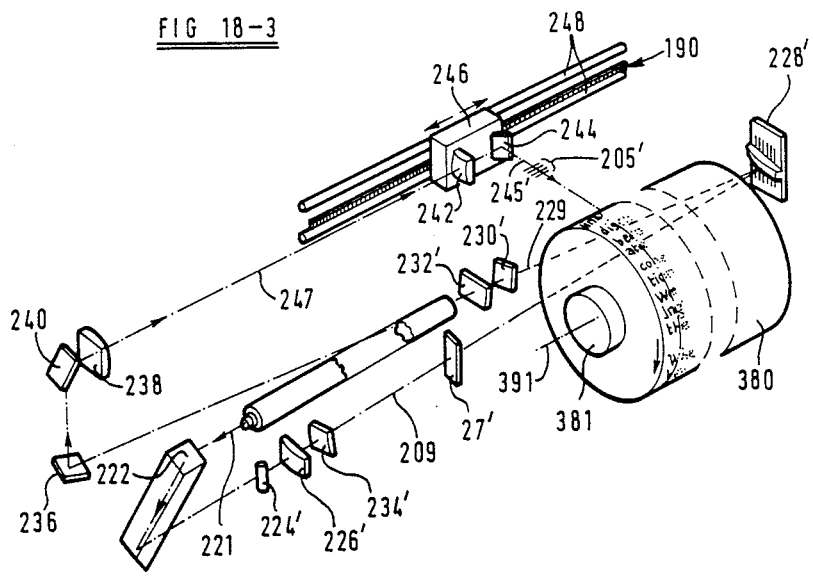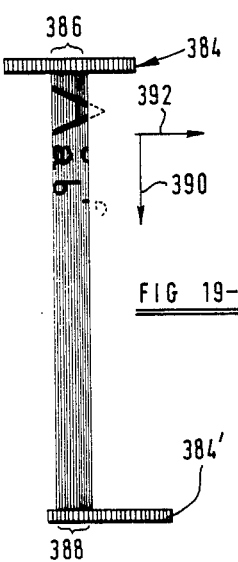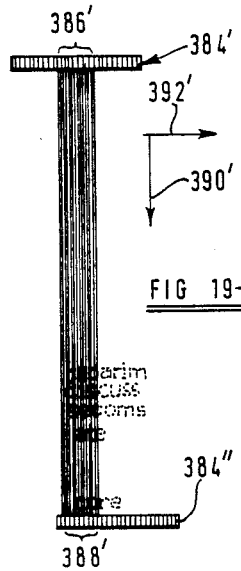

HIGH-SPEED BROAD-BRUSH LASER PHOTOCOMPOSITION

This application is related to U.S. patent application Ser. No. 800,519 filed on Nov. 21, 1985. The disclosure of that patent application hereby is incorporated herein by reference.

This invention relates generally to photocomposition, and more particularly to the photographic composition of full pages containing text matter of typographic quality and graphics. Still more particularly, this invention relates to photocomposition using a laser light source.

A problem of long standing in photocomposition is the problem of increasing the speed of composition, particularly without excessively decreasing the quality, versatility or other beneficial qualities of the photocomposing equipment. The use of a laser source in photocomposition creates the potential for very high composing speeds without significant reduction of those beneficial qualities. However, the potential benefits have not been fully realized in prior equipment and methods.

Accordingly, one object of this invention is to increase the composing speed and/or resolution attainable by laser photocomposing equipment and methods. In particular, it is an object to increase the speed without deleteriously affecting the other operational parameters of the equipment and methods, and also, or instead, increasing the resolution.

Other problems in photocomposition are caused by the requirement, in some prior systems for intermittently driving the line-spacing or leading mechanism. Not only does this reduce the potential speed of the equipment, but it also can cause a deterioration of composition quality.

It is an object of the present invention to provide a "wide brush" laser photocomposing machine and method—as described in the above-identified co-pending U.S. patent application—in which the photosensitive material is moved continuously rather than intermittently.

It also is an object of the invention to provide a relatively compact photocomposition device and a simple method both with the foregoing improvements, as well as the capability of composing relatively large areas of text and graphic matter relatively easily and efficiently. It is an object to enable the composition of whole newspaper pages, or even double pages, quickly and easily, and with high quality composition.

It is a further object to provide such a device and method in which the output can be switched between different photosensitive surfaces relatively easily.

In accordance with the present invention, the foregoing objects are met by the provision of a photocomposing device and method in which laser beam forming a "brush" is scanned across a photosensitive surface to form images, with the laser beam and the surface moving relative to one another continuously to maximize the speed of composition, and the positioning of the images on the photosensitive surface being corrected in order to compensate for the relative motion, thus forming straight lines of composition across the photosensitive surface.

In one embodiment, in which the laser beam is shaped by a linear array of modulating elements, or "gates", less than all of the gates are used at one time to form the beam into a "brush". As the photosensitive surface moves, the location of the active gates is shifted, thus gradually shifting the position of the final image formed by the optical system to maintain a straight line of composed images.

In another embodiment, an optical micrometer is positioned in the laser beam path. The micrometer is used to shift the paths of the laser beams as the photosensitive surface moves.

In another embodiment, the laser beams are redirected by a pivotable mirror to make the required corrections. The pivotable mirror also can be used to direct the laser beams alternatingly between two different photosensitive surfaces.

In other embodiments, a combination of the above-described means is used to perform the corrections. One type of correction can constitute the "coarse" correction and another "fine" or more precise correction.

An extremely high-speed photocomposition device is created by using a laser "brush" source together with a known rotating polygon mirror. Each sweep created by a moving facet of the mirror develops a plurality of scan lines instead of just one. A correction for the rapid continuous motion of the photosensitive surface is necessary. One or more of the correction methods described above, preferably the gate-shifting method, can be used to make the necessary corrections.

Other particularly advantageous embodiments of the invention are ones in which the photosensitive surface, such as a flexible printing plate, is wrapped around and secured to a drum. The drum rotates continuously, but the laser projection means moves either continuously or in steps. The character images are formed in circumferential rows or columns, and a whole page of composition can be completed with one traverse of the drum surface by the projection means. The laser projection means is very light-weight. If the projection means moves in steps for line spacing, the light-weight laser projection means is moved instead of the more massive photosensitive surface or drum. This increases the composing speed without requiring corrections for continuous motion.

Further increases in composing speed are attained by assuring that the sweeps of the laser "brush" are of the same width and are contiguous at all times, regardless of where the boundaries between adjacent sweeps occur. Thus, full characters may be created during one sweep, whereas only parts of characters are formed during the next sweep. The formation of characters or other images under these circumstances is handled by a raster image processor, which stores full pages or portions of pages, rather than one line at a time. Thus, the maximum composition is achieved during each sweep, and the composing speed is increased.

Although the use of a laser "brush" is preferred, other types of laser light sources also are usable to advantage in the invention.

The invention is further explained and described with reference to the accompanying drawings, in which.

Figure 4:
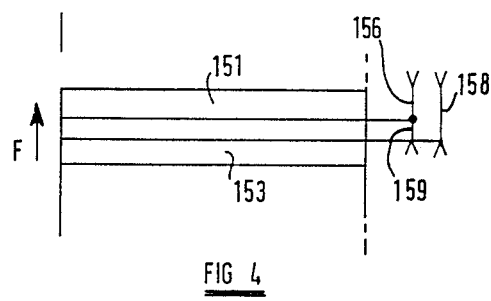
Figure 5:
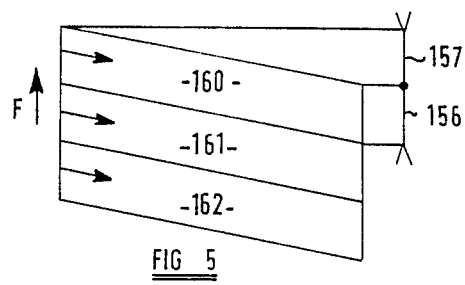
Figure 6:
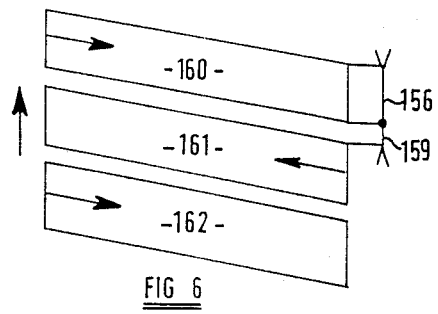
Figure 7:
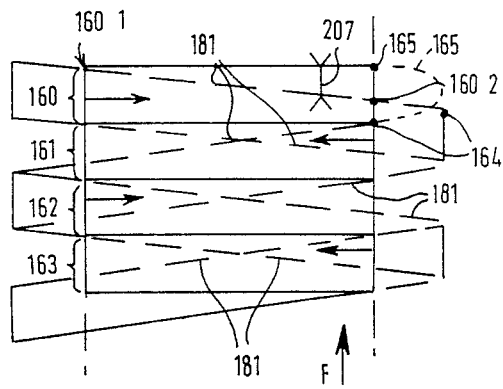
Figure 8:
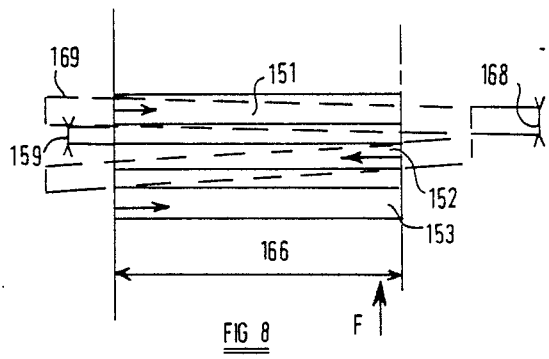
Figure 8A:
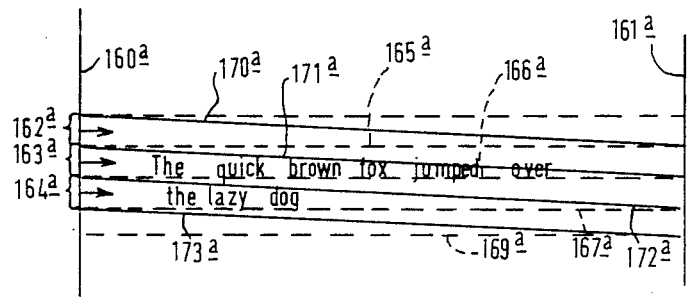
Figure 9:
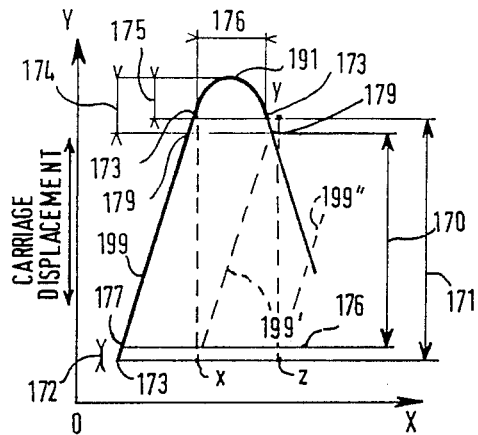
Figure 10:
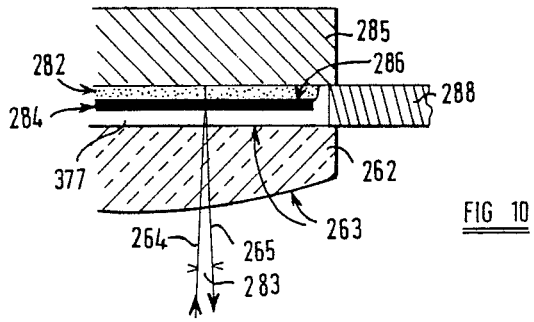
Figure 11:
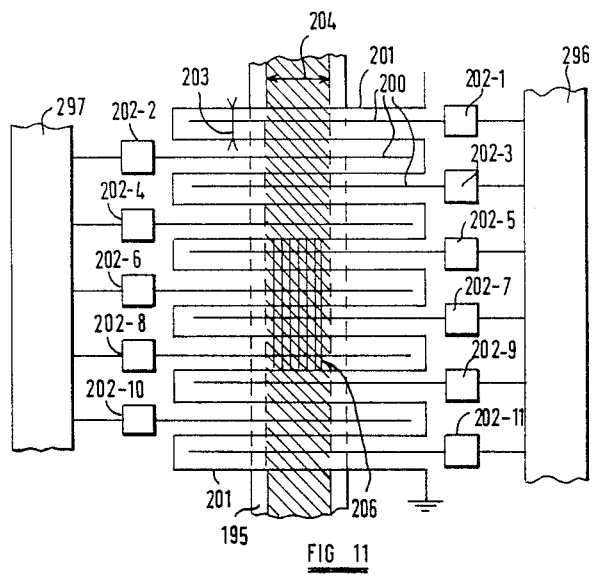
Figure 12:
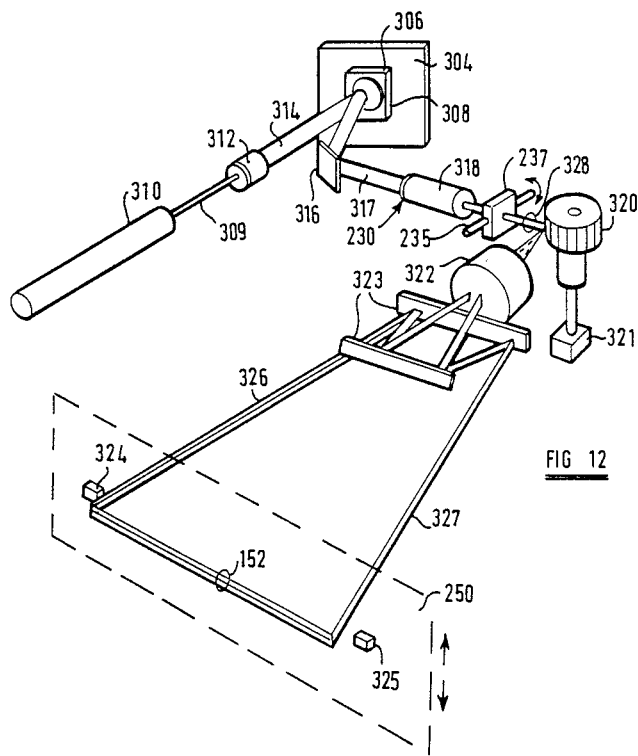
Figure 13:
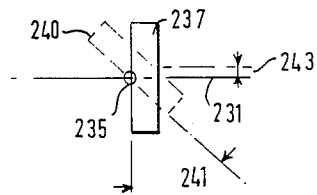
Figure 14:
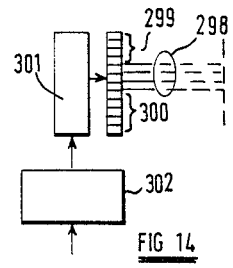
Figure 15:
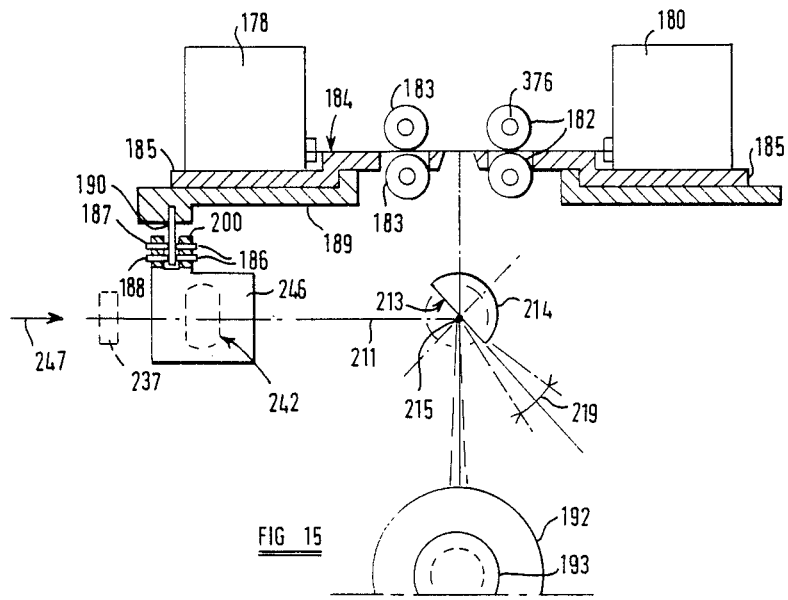
Figure 16:
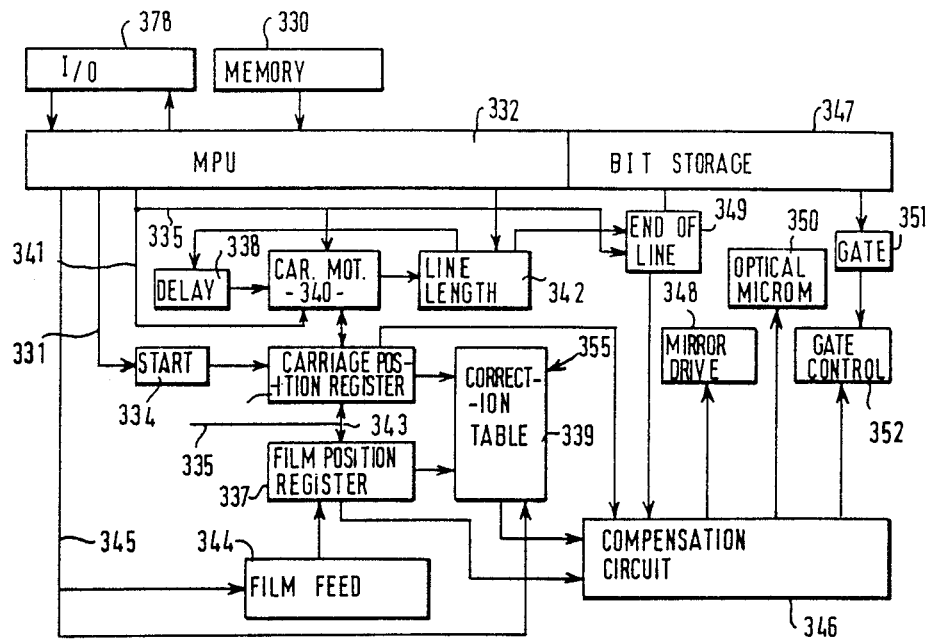
Figure 17:
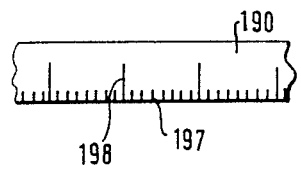

FIG. 4 schematically shows two lines of characters projected on a stationary photosensitive medium;

FIG. 5 represents three successive "wide brush" scans or sweeps produced on a continuously moving photosensitive medium from a continuously rotating multi-faceted polygonal mirror, with no compensation for motion of the medium;

FIG. 6 is the same as FIG. 5 except that the scans are projected from a carriage moving continuously alternately in the forward and reverse directions;

FIG. 7 shows the scans of FIG. 6 with the use of compensation means in accordance with the invention;

FIG. 8 represents three separate lines of characters obtained with continuously moving projection means and a continuously moving photosensitive medium;

FIG. 8A represents an alternative correction means;

FIG. 9 is a graphic representation of the displacements of the projection unit utilized to scan the width of the continuously moving photosensitive medium;

FIG. 10 is a schematic, partially cross-sectional, partially broken-away view of a laser modulator used in the invention;

FIG. 11 is a schematic view of the controlling electrodes of the modulator of FIG. 10;

FIG. 12 is a schematic representation of another embodiment of the invention;

FIG. 13 illustrates the operation of an optical micrometer used in another embodiment of the invention;

FIG. 14 is a schematic view of another feature of the invention;

FIG. 15 is a schematic view of another embodiment of the invention which provides compensation for continuous carriage and film motion and also provides shifting from one photosensitive surface to another;

FIG. 16 is a block diagram illustrating the electrical operating system of the preferred embodiment of the invention;

FIG. 17 represents a portion of a grating utilized to detect the position of the image location carriage in the preferred embodiment of the invention;

FIGS. 18-1, 18-2 and 18-3 are perspective views of different embodiments of the invention in which the photosensitive surface is located on a continuously spinning drum and a continuously moving optical system traverses the length of the drum only once for each page of composition;

FIGS. 19, 19-1, 20-1, 20-2 and 20-3 are schematic drawings showing how images or lines are formed in the embodiments of FIGS. 18-1, 18-2 and 18-3.

Figure 21:
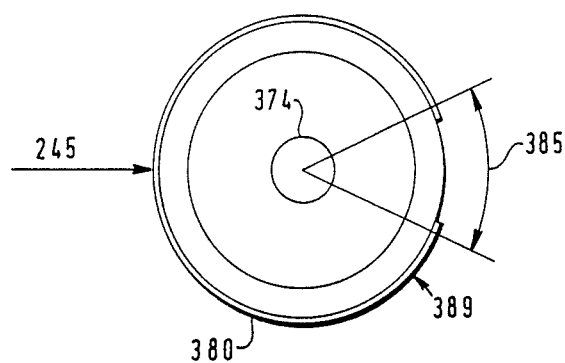
Figure 22:
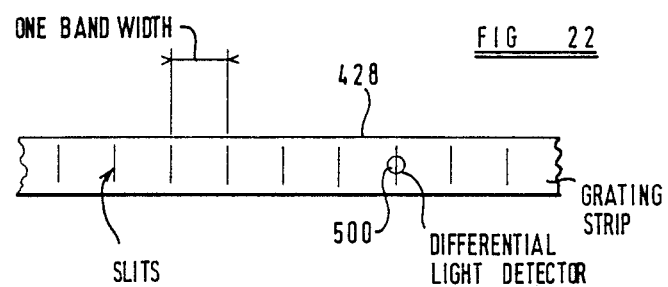
Figure 23:
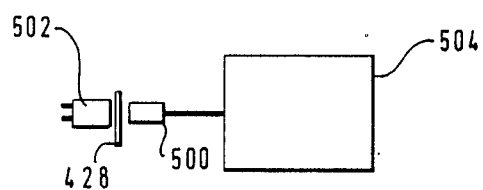

FIG. 21 schematically shows the location of imaging rays relative to the drum in the embodiments of FIGS. 18-1, 18-2 and 18-3; and FIGS. 22 and 23 are schematic views of an alternative compensating arrangement for the prior embodiments of the invention.

GENERAL DESCRIPTION

Figures 1, 18:
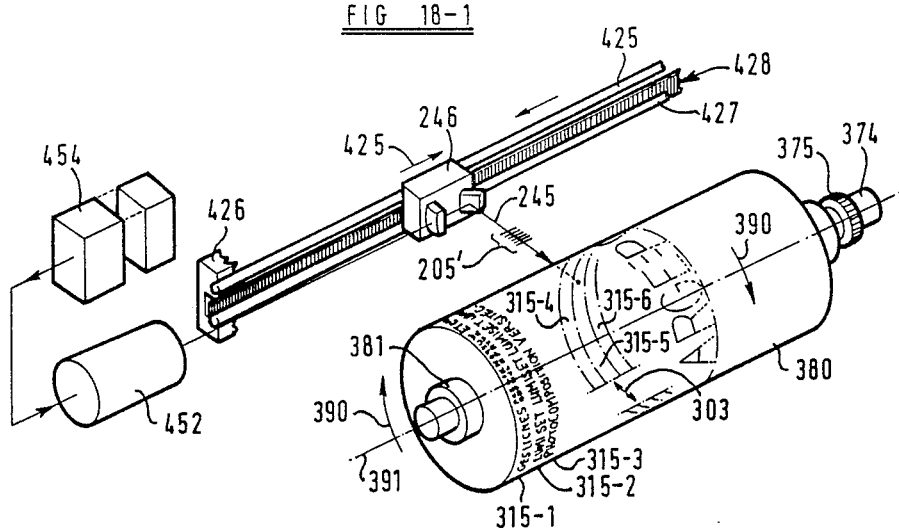
FIG. 1 is a simplified, partially schematic perspective view of the preferred output unit of a photocomposing machine constructed in accordance with the invention.
Figures 2, 18:
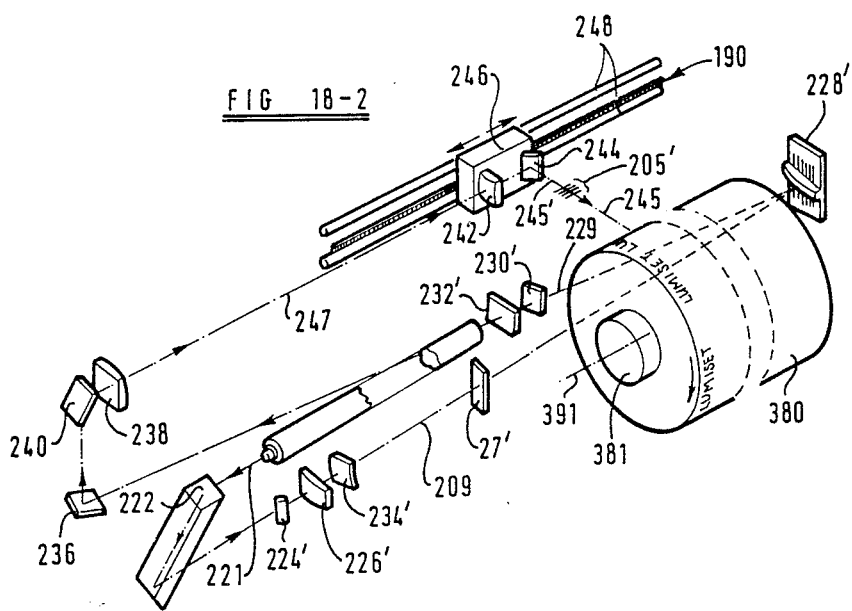
FIG. 2 is a schematic view illustrating the gradual formation of a portion of graphic material created by adjacent multiple raster lines.

The major components of the photocomposer are shown in FIG. 1, which is the same as FIG. 2 of the above-identified co-pending application Ser. No. 800,519, except that mirror 239 can rotate around shaft 233, and in that the optical system includes an optical micrometer shown in dashed lines at 237, pivotable mounted on a shaft 235, and an afocal "zoom" lens system shown at 382 Other differences will be explained in the following description.

FIG. 1 shows a He-Ne laser source 220 which produces a narrow beam of polarized light 221 which, after being folded by mirrors 222 and 223, goes through a single-plane expanding device including cylindrical lenses 224, 226 and 234. In the present description, the plane perpendicular to the axis of these cylindrical lenses is called the vertical plane, and the orthogonal plane, i.e, the plane containing the axis of the cylindrical lenses referred to above, is called the horizontal plane.

Lenses 224, 226 and 234 shape the cylindrical laser beam 221 into an elongated, narrow strip of light 209 which impinges on the light gate array or modulator 228 from which, as will be explained later, the light is reflected back to pass through a polarizer 230 and cylindrical lens 232. Beam 209, after modulation by the lightgates array 228, is represented by reference number 229. Lenses 232 and 238 constitute a telescope, as shown in greater detail in FIGS. 4 and 5 of the co-pending application Ser. No. 800,519.

Beam 231 emerging from lens 232 is deflected by mirror 236 and is folded again by pivotable mirror 239, which is the first component of the optical system which may be caused to move by rotation around axis 233 for correction purposes, as it will be explained below. The beam reflected by mirror 233 may be directed to an optical micrometer 237 which also is used for correction purposes The collimated laser beam 247, composed of parallel light rays, enters the de-collimating and focusing system comprised of lens 242 and mirror 244 mounted on a sliding carriage 246 supported by rails 248. The converging beam 245 is in the shape of a narrow, elongated bundle of rays when it reaches the film 250. The displacement of carriage 246 along its rails causes the narrow beam to traverse or sweep across the film as shown at 252.

The gradual formation of images by a sequence of adjacent wide brush sweeps is illustrated schematically in FIG. 2, in which the light gates array or modulator is shown at 228, and the multiple scan lines of the wide brush at 217. Additional light gates 216 and 218 can be provided for correction purposes, as it will be explained below. Portions of images or full characters created by one wide brush sweep are shown at 210. Shown in FIG. 2 as examples of characters or parts of characters formed by one sweep are the upper portion of a large upper case "A", a complete lower-case "a", and part of a lower case "p".

Thus, the width of each sweep advantageously is set without regard to line spacing, character size, or other variables. Each sweep is of the same width and abuts the adjacent sweep so as to accurately join character and other image parts to form whole images.

This increases composition speed as compared with prior art devices in which a maximum of one full line of characters is composed with each sweep; with the present invention, parts of additional lines of text can be composed in the same sweep as used to compose a full line.

Although a wide brush sweep is preferred, it can be understood that the number of scan lines 217 of FIG. 2 can be varied from two to 256 or more. It is evident that the speed at which images can be created depends on the number of scan lines per sweep (for a given resolution) and the displacement speed of the sweep across the film.

Figure 3:
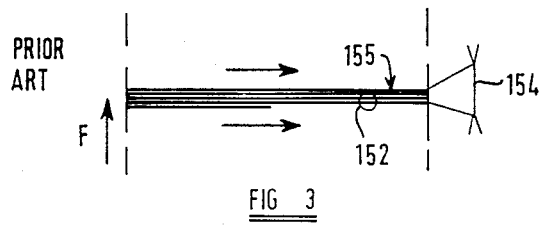
FIG. 3 represents the formation of images in single-scan-line photographic printer of a known design.

In existing laser printers using rotating polygonal reflectors, images are created by successive single-line scan rasters, in the manner indicated in FIG. 3. In this case, the film (or more generally photoreceptor drum) moves continuously in the direction indicated by the arrow "F". No compensation for the simultaneous displacement of the light line and film is necessary because of the considerable difference between scanning and drum speeds and the very thin scan line. For example, in FIG. 3, a scan line 0.025 mm (0.001 inch) thick is shown at 155. In order to have adjacent (or slightly overlapping) lines, the film moves 0.025 mm (0.001 inch) or less as the light spot traverses the film width. Had the film been stationary, the trace left by a luminous spot would be as shown at 155; but because the film has moved, the actual trace will be distant from the location line 155 at the end of a scan by a distance 154. As this amounts to a very small value, no compensation is necessary and the fact that the drum (film) moves during each scan can be ignored.

When a wide brush is utilized, lines of text such as shown at 151 and 153 in FIG. 4 can be produced on a stationary film that is moved in the direction indicated by arrow "F" by a distance 158 representing the width of the sweep 156, plus the interline spacing 159. The usual procedure is to produce lines of text on the stationary film and move it in the direction of the arrow "F" by the proper amount before the next sweep. This procedure can introduce delays and/or inaccuracies because of the "start-stop" motion of the film and the inertia of the film feeding (or drum moving) mechanism. In order to avoid such problems, it is desirable to move the film either at a constant speed, in synchronism with the projection scanning means or to modulate the film speed.

The appearance of successively projected wide brush areas is shown at 160, 161 and 162 in FIG. 5. In this Figure, it is assumed that the wide brush moving means is in the form of a multi-faceted polygon, as shown in FIG. 12. In this case, the "brush" moves in the same direction for each sweep from left to right as shown in FIG. 5, where it is assumed that the polygon is so arranged that no time is lost between consecutive scans, or at least no more time than is necessary to produce exactly joining sweeps. However, the speed at which the film moves, in the direction "F", is higher than the film speed in the prior art embodiment of FIG. 3. Therefore, the film moves by a distance 157 between multiple line scans of the same width, and the swept areas appear slanted. The distance 157 is much greater than the distance 154 in FIG. 3 due to the much greater speed of film movement.

FIG. 6 shows the appearance of sweep areas 160 to 162 when a carriage similar to carriage 246 of FIG. 1 is utilized to perform composition while traveling in both the forward and the reverse directions. The gap 159 between consecutive areas is caused by the turn-around time of the carriage at the end of each wide-brush scan. The arrows in FIG. 6 show the directions of carriage movement.

COMPENSATION FOR FILM MOTION

It is a feature of the invention to provide for simple means to compensate for the continuous film motion so that successive sweeps of the wide brush are contiguous with such accuracy that it is normally very difficult, if not impossible to distinguish individual scans from one another.

The graph of FIG. 9 illustrates the function and purpose of the correcting or compensating mechanism. In FIG. 9, the y coordinates represent the traveling carriage displacement as a function of the time elapsed, and the elapsed time is represented by the x coordinates. Starting at point zero, the carriage starts its translating motion, accelerates and reaches its full established constant "cruising" speed at 173, a short distance before the light rays it carries reach the margin of the image-receiving area at 177. The total distance covered by the carriage while traveling at a constant speed is represented by distance 171, and its "active" travel, corresponding to the length of the image-receiving area across the film 20 is represented by the distance 170.

A short distance after the carriage has moved the light beams beyond the opposite margin of the image-receiving area, at point 173' of the curve, the carriage decelerates, stops and accelerates to reach its constant cruising speed in the opposite direction at point 173". Its speed and direction are controlled by properly programmed electronic computer means. The total "turn-around" time is represented by distance 176, and the distance traveled during this time by distance 174.

The purpose of the compensating means is to make the image-receiving area "run" after the film as it moves. In order to compensate for the "turn-around" time, the film speed is determined so that the beginning of the projection of the following adjacent block of images does not occur before the carriage has reached its cruising speed and the compensating mechanism has returned to zero, as it will be explained below. The compensating mechanism, which may consist of a coarse and a fine system, is continuously monitored by feed-back information generated by carriage position and film position encoding means.

In the embodiment in which the sweep mechanism is a rotating multi-faceted polygon as shown in FIG. 12 (or a galvanometer—mirror mechanism), the sweep motions are represented by parallel lines 199, 199' and 199", each line corresponding to the passage of one reflecting facet of the polygon. The "dead time" separating one sweep from the next is represented by 176', which corresponds to the turn-around time of the carriage mentioned before, but is much shorter since very little time may be lost with a polygon from sweep to sweep, compared to the reversal operation of the carriage.

FIG. 7 represents, in solid lines, a series of four contiguous image areas or blocks 160 to 163 as they would appear on the film if the carriage were projecting the light emerging from only the highest and the lowest gates of the active gates in the array of gates. As it will be explained in greater detail below in the discussion of the "gate shifting" correction technique, substantial numbers of gates are left unused in order to provide compensation for skewing due to simultaneous continuous motion of the film and projection mechanism. The thin phantom lines such as 181 represent the traces that would be left on the film by the highest and lowest active gates, in absence of any compensation. The direction of travel of the carriage is shown by an arrow in each block. The compensating means shifts the location of the active gates to keep the light from the uppermost active gate in synchronism with the film motion so that it moves in a straight line perpendicular to the edge of the film from position 160'-1 (beginning of projection) to point 165 (end of projection). If no compensation were made, point 165 would be at 160-2. The curve followed by the light from the uppermost active gate if it were "on" during turn-around of the carriage is shown at 165'. The distance between point 160-2 and 165 represents the compensating value produced by the correction mechanism during the actual projection of the image block, and the distance between points 160-2 and 164 represents the distance traveled by the film during the turn-around time. Point 164' represents the extreme point of travel of the carriage and corresponds to point 191 of the curve of FIG. 9.

The compensating system which is one object of the present invention can also be utilized in the case where the film moves continuously but the lines of text are not contiguous, as described in the co-pending application Ser. No. 800,519. FIG. 8 represents three such non-contiguous text lines 151, 152, 153. In this Figure, 166 represents the length of line (distance between margins); 159 the interline spacing; and 168, the height or point size of the characters. The correction mechanism operates as explained above, except that the carriage return is delayed by an amount of time which is a function of the interline spacing desired. It is evident that, in this case, each sweep must contain complete characters.

Three correction or compensating mechanisms will be described in relation to FIGS. 8A and 10 to 17. FIGS. 10 and 11 represent the light-gates array in schematic form. FIG. 10 is similar to FIG. 9 of co-pending application Ser. No. 800,519. Light beams 264 emerging from the laser source and front optical system enter lens 262 through the anti-reflection coating 263, through the material of PLZT wafer 284 supported by base 288, and are reflected back by a mirror 285. The electroded surface of the PLZT wafer is shown at 286. This surface is isolated from the front mirrored surface of 285 by a coating of appropriate gel shown at 282. The entering light rays are at a slight angle 283 so that the returning rays take a different path shown at 265. In actual practice, angle 283 is very small. Actually the plane defined by rays 264 and 265 is perpendicular to the plane of the drawings.

In FIG. 11, the controlling electrodes on the PLZT wafer surface 286 such as electrode 200 are connected to individual drivers 202-1 to 202-11, and the single common grounded electrode is shown at 201. When an electrode such as 200 is energized, the electrical field created between it and the common electrode 201 changes the polarization of light passing through the area 203. This allows the light transmitted through area 203 to pass through the polarizer 230. Thus, the area 203, in effect, operates like an open "gate". The electrodes shown in FIG. 11 are considerably enlarged. A gate such as gate 203, when projected onto the film through appropriate optics, may be of the order of 0.025 mm (0.001 inch) in width.

The electrodes 201 are controlled by control circuits 296 and 297 as more fully described in the co-pending application Ser. No. 800,519.

An aperture plate 195 may be positioned adjacent to the PLZT wafer in order to limit the width of the gates to a selected value 204. The shaded area of FIG. 11 represents the aperture The more heavily shaded portion 206 represents the area which is "transparent" when drivers 202-5, 202-6, 202-7 and 202-8 are energized for example. In this case, four adjacent scan lines can produce on the film a line 0.100 mm (0.004 inch) thick. Of course, the open time of each of these four gates can be individually controlled to produce a very small spot on an image area.

POLYGON MIRROR EMBODIMENT

The electrodes located above and below electrodes 205-5 to 205-8 can be utilized for the electronic "fine" compensation of the film motion, as will be explained in relation with FIG. 12 which is a schematic representation of a modified "laser printer" or typesetter now commercially available. In this particular case, in order to increase the performance of the printer with a minimum change in existing optics, the light brush may be limited to a relatively small number of scan-lines; for example, as shown in FIG. 3, where four scan-lines are identified by reference numeral 152. However, even in this extreme case of compensation, as the scan lines' thickness may vary from 0.025 mm (0.001 inch) for very good resolution to 0.050 mm (0.002 inch) or 0.075 mm (0.003 inch), a correction system should be utilized. In general, the number of scan lines is variable between 16 and 64, depending on the RIP (raster image processor) capability.

In FIG. 12, the laser source is shown at 310, it output beam (preferably polarized) at 309 and an optical system preferably producing narrow, elongated beams 314 at 312 by use of a PLZT spatial modulating unit 304 of the type shown in FIG. 10. A mirror 316 bends the now modulated thin bundle of rays, shown at 317. These enter the polarizer 230 and the system 318 from which they emerge to go through an optional optical micrometer 237, from which emerging beams 328 reach a multi-faceted rotary polygon mirror 320 driven by a motor 321. After being deflected by the mirror facets of the polygon, beam 328 enters focusing optics 322 and then is reflected by further correcting mirrors 323 before reaching the film 250. The optical system is such that beams 326 and 327 are made up of closely-spaced light rays contained in a plane perpendicular to the plane of the film and parallel to its edges. As the polygon 320 rotates, each of the scan lines (not all shown in the drawing) moves between two end-of-line detectors 324 and 325, also known in the art.

The speed at which the film moves is much higher than in prior polygon-mirror devices, thus giving higher composing speeds.

If it is necessary to delay the start of a new sweep to let the film catch up to the mirror, the operation of the mechanism can be delayed until one or more mirror facets have passed by.

GATE SHIFT CORRECTIONS

This new construction increases both the speed and resolution of existing printers and typesetters.

The compensation necessitated by the continuous arrangement is shown in FIG. 14, where the scan lines utilized at the beginning of a sweep are shown at 298. Additional or "in reserve" scan lines, shown at 299 and 300, can be selected to gradually replace the original lines 298 by the use of a shift register 301 controlled by the compensating circuit which maintains the position of the scan lines bundle in synchronism with the position of the film. For example, assuming the scan lines 298 generated by the central gates are utilized at the beginning of a sweep, the next gate of group 299 can be used in replacement of the lower gate of group 298 at a fraction of the sweep length, then the next upper gate replaces the new lower gate, and so on. In this manner, incremental corrections of the order of 0.025 mm (0.001 inch) are periodically introduced to

MEMORY-SHIFT CORRECTIONS

When any text is composed in a device producing contiguous wide brush strokes where compensation is not needed (e.g., in a device in which film feed is inter-stationary during each sweep) gate operating instructions are stored in the random-access memory ("RAM") of the computer used to control the photocomposing machine as a plurality of n-bit words, where "n" is the number of active gates in the gates array. Each word thus consists of up to 256 separate instructions for the gates, if there are 256 gates in the array. For each full sweep, there are x separate words, where "x" is the total number of vertical lines of dots in the sweep. For example, if a resolution of 1280 lines per inch is selected, for a sweep ten inches long, 12,800 256-bit instructions will be stored in RAM. Then, as the carriage moves across the film, each of the words is read out of memory in sequence and instructs the light gates to open in the desired sequence to form the characters or portions of characters or other graphic matter to be formed during that sweep.

FIG. 8A illustrates, as an example, two lines of text composed by the structure of FIG. 12, with a pattern similar to that shown in FIG. 5, or in one of the continuously-rotating drum embodiments to be described below. In both structures, each sweep always starts at the left margin, 160a, with spacing such that the sweep accurately joins with the preceding sweep.

Referring to FIG. 8A, in the first sweep defined by the left and right margins 160a and 161a, and dashed lines 165a and 166a, the computer previously will have stored instructions such that all of the characters in the first line of the example, "The quick brown fox jumped" over will be formed, except for the descenders or lower portions of the letter "q" and "j". The instructions stored for the next sweep defined by dashed lines 166a and 167a that all of the characters "the lazy dog" will be formed during that sweep, except for the descender or lower portion of the letters "y" and "g" and the descenders of the first line. Then, for the third sweep, defined by dashed lines 167a and 169a, the only, instructions stored are those for the descenders of the letters "y and g", and that is the only character portion formed during the third sweep.

When the gate shifting means and method is used to compensate for skewing due to simultaneous continuous motion of both the film and the projection carriage, then the width of the sweep is reduced by the number of light gates the film moves during each sweep. For example, if the film moves by a distance corresponding to 128 of the 256 light gates, the sweep can be only 128 gates in width because one half of the gates must be used in the shifting process to provide motion compensation. The shift register 301 described above and shown in FIG. 14 shifts the active array of gates downwardly by one gate for every m vertical lines, where "m" is equal to "x", the total number of vertical lines in one sweep, divided by the number of gates the film moves during the sweep. For the example given above, where x=12,800, m=x/128, and m=100. Thus, the active gates array will shift down by one gate for every 100 vertical lines.

An alternative correction method is performed entirely by means of software.

The same result as in the gate-shifting method can be achieved in software without diminishing the number of active gates by simply shifting the addresses in memory from which the gate operating instructions are retrieved during each sweep. In the example given above, the addresses from which instructions are retrieved are shifted by one for every 100 vertical lines in the sweep. By this means, the character portions between the solid lines 170a and 171a will be formed during the first sweep 162a; the character portions between lines 171a and 172a are formed during a second sweep 163a; and the character portions between lines 172a and 173a are formed during a third sweep 164a.

It should be noted that the first sweep 162a started one sweep-width before the first sweep starts when the sweep occurs with the film stationary. Nevertheless, this method requires only three sweeps, each having all of the gates available for use, and thus provides motion compensation while allowing each sweep to be of maximum width. This helps to maximize the speed of composition.

Another way to achieve the same result is to encode and store the gate operating instructions in memory in the same pattern as the character portions have between the slanted lines such as lines 170a, 171a. With this change, the shifting of addresses in memory is not necessary. For example, instructions for forming the tips of the letters "b", "f", and upper portions of "fox", "jumped" and over are stored for the first sweep 162a; the remainders of the characters for the second sweep 163a and so forth.

OPTICAL MICROMETER CORRECTION MEANS

An alternative correction means is shown in FIG. 13. It consists of a well-known optical micrometer consisting of a glass plate 237, which can be pivoted around pivot axis 235. A relatively large rotation of the glass plate results in a relatively small displacement 243 of the light beam 231 when it emerges from the micrometer. The displacement depends on the thickness of the glass 237, the angle of rotation 241, and the refractive index of the glass. In the Figure, a relatively large rotation of the optical micrometer from position 237 to position 240 results in a small parallel displacement of the emerging beam represented by 243 for a relatively thin micrometer glass plate. The optical micrometer can be used as a "coarse" correction means, in conjunction with gate-shifting means described above, or it can be used alone.

ROTARY MIRROR CORRECTION MEANS

The arrangement of FIG. 15 illustrates another "coarse" correction means. The light beams 211 emerging from carriage 246 are reflected by mirror surface 213 of a rotary mirror structure. The photosensitive surface is located on a drum 192 which is rotated continuously by a drive motor 193. The carriage 246 moves parallel to the axis of drum 192 (towards and away from one viewing FIG. 15). The mirror is rotated around axis 215 in order to maintain the projected images in a straight line perpendicular to the film margin. The maximum angular rotation for the widest block of images generated by a large light brush is represented by the angle 219.

An encoder 214 of high accuracy is utilized to transfer to the control circuit continuously the location of the mirror and, consequently, the location of the reflected beams of light.

The mirror structure also can be rotated ninety degrees in order to transfer the light rays 211 from the drum 192 to a different photosensitive surface, for example film 184, driven continuously by rollers 182 from a supply cassette 178 through idler rollers 183 to an output cassette 180. Both cassettes are mounted on a common plate 185 removably attached to the general frame 189 of the machine. Two or more of the rollers preferably are integral with a decoder shown schematically at 376, in order to give accurate information as to the movement and location of the film 184 to the compensating circuit at all times. The carriage 246 is provided with an extension 206 having a slot in order to accommodate a grating 190 which is attached to the frame of the machine. At one side of the slot is mounted light-emitting means 186, and at the other side is mounted two photoreceptors 187 and 188. The light-emitters (e.g., light-emitting diodes) shine light through the grating 190 towards photoreceptors 187, 188. As it can be seen in FIG. 17, the grating has closely-spaced marks 197 and more widely-spaced marks 198. Photoreceptor 188 generates a pulse for each small incremental displacement of the carriage (at least one pulse for each increment of the order of 0.025 mm (0.001 inch), in conjunction with the marks 197 on the grating 190. Photoreceptor 187 is utilized to create an end-of-scan or beginning-of-scan pulse for each sweep. It cooperates with marks 198 of the grating. A "fine" tuning optical micrometer is shown in phantom lines at 237. Its purpose is to correct any deviation too small to be taken care of by mirror 213.

It is apparent that any one of the "fine" correction devices described above can also be used in the case of a "start-stop" motion of the photosensitive medium to correct any small deviation from the desired position of the medium caused by mechanical inaccuracies. It also can be utilized to produce, on a stationary film, closely-spaced adjacent thin lines for the creation of horizontal rules of various thickness.

If the arrangement of FIG. 15 is not utilized and the light beams emerging from the carriage are directly received by the medium, for example as shown in FIG. 1, an optical micrometer provided with a relatively thick glass plate can be used as a "coarse" correction means, rather than controlling the orientation of mirror 239 around axis 233 (FIG. 1). The glass plate 237 of the optical micrometer being in parallel light, no special optical correction may be necessary. Of course, for "fine" correction the "gate shift" correction system described above is preferred.

CONTROL CIRCUITRY

The control circuitry shown in block diagram form in FIG. 16 is used to control the compensation mechanism described above. It is assumed that at least one section of the page to be composed, at least as wide as the wide rush width, has been stored in raster form in memory unit 330, as is known in the art. This unit transfers "on demand" to the CPU 332 of the photounit controller and its bit store unit 347 all the information necessary to produce the desired image slices for each successive wide brush sweep. Some of the information entered into unit 332 by data storage 330 include the length of line (or length of each wide brush block), the film speed (which depends on the length of line), the carriage speed, the width of each "wide brush" expressed in the number of scan lines produced by each sweep, and the line spacing or leading value, in the case where individual character lines are produced.

Before the beginning of the first sweep, the controller stores in memory unit 342 a value representing the length of line desired, expressed in carriage travel increments. It also informs the carriage motor control circuit 340 of the selected carriage speed and starts the film feed mechanism 344. After the necessary parameters have been selected, a start pulse sent over line 331 enters unit 334 to initiate the start-a-new-sweep routine. From this moment the carriage motion approximately follows the beginning of the curve of FIG. 9 from point zero under the command of a program stored in memory unit 349.

As soon as the carriage 246 has reached its cruising speed and generates through detector 187 (FIG. 15) a "begin-a-new-sweep" signal, the continuous train of pulses produced by photoreceptor 188 and grating 190 are sent to the carriage position register 336 as well as to the counter 342 to decrement the previously-stored value which represents the total number of carriage pulses contained in the total length of a wide brush block.

As the film is continuously moving at a pre-determined speed under the control of unit 344, the incremental motion of the film feed rollers is entered into the film position register represented by unit 337. Units 336 and 337 feed information as to the respective carriage and film positions and motion to unit 339. Unit 339 contains a correction table whose purpose is to maintain "ghost" gap 207 (FIG. 7) at zero in order to produce straight lines of characters or other images on the film. Information necessary to compensate for film motion is sent by unit 339 to unit 346, which contains the necessary circuitry to control either the "coarse" mirror compensator mechanism 348, or the optical micrometer unit 350, or the compensating light gates shift circuit light-gate unit 352. As the carriage moves, the necessary information as to which gate to open (which depends on the carriage location) is sent from storage 347 to the light-gates control unit 352 through gating circuit 351. At the end of a sweep, when the counter 342 reaches zero, a pulse is sent by 342 to a delay circuit 338 and an end-of-line circuit 349. The delay circuit is used mostly in the spaced-sweep mode (see FIGS. 4 and 8) to introduce the desired line spacing, or the unit 349 may receive a command from controller 332 through "leading" wire 335 to slow down the carriage return operation in order to allow the film to move the necessary amount to obtain the desired white area between scans. The end-of-sweep routine also causes the return to zero of the compensating means.

Although the above circuit is described as it is used with film and its driving mechanism, it also applies to an electrophotographic drum or a drum supporting any photosensitive surface, including printing plate material, or to a tilting mirror or rotating multi-faceted polygon. In the latter case, pulses can be generated by the mechanism utilized to spin the polygon at a constant speed to instruct the compensating mechanism of the instantaneous position of the scanning bundle of rays.

ROTARY DRUM CHARACTER SPACING EMBODIMENT

Other embodiments of the invention are illustrated in FIGS. 18-1 to 20-2. The embodiment of FIG. 18-2 will be discussed first.

The optical arrangement of FIG. 18-2 is similar to the arrangement of FIG. 1 of the co-pending application Ser. No. 800,519, except that, in the embodiment of FIG. 18-2 the displacement of carriage 246 is utilized to space lines of characters or contiguous wide-brush sweeps, while the rotation of drum 380 assembles elementary rows of light dots into characters and spaces the characters from one another. In other words, the respective functions of the moving carriage and photosensitive surface of the previous description are reversed.

One of the major advantages of the present embodiment is that the translating carriage traverses the useful surface of the photoreceptor only once per page. The arrangement of the optics of FIG. 18-2 is such that the divergence of the bundle of rays 247 emerging from collimating lens 238 is very small. This makes it possible to move carriage 246 along a relatively long path, e.g., up to four feet, without losing any of the light rays of bundle 247 which, as it is described in the co-pending application Ser. No. 800,519, has converging rays emerging from the modulator 228, and a converging-diverging cross-sectional shape at increasing distances from lens 238. The distance covered by the travel of carriage 246 can, for example, exceed the full length of a newspaper page, or approximately 23" (580 mm). The useful size of the film or printing page located on drum 380, as measured circumferentially around the drum, corresponds to the full width of a newspaper page, for example 108 picas (15" or 457 mm). Thus, the diameter of the drum, taking into account the margins and certain "dead" zone, could be 7" (203 mm).

Still referring to FIG. 18-2, the drum rotates around its axis 391 during the composition of a full page. The page can contain both text and graphic matter. An encoder 381 attached to the drum continuously and constantly informs the control circuits of the drum position, particularly to maintain synchronism between the drum rotation and the carriage movement. The speed of the drum can be two revolutions per second to produce a full newspaper page 15" by 23" in one minute, with a vertical and horizontal resolution of 1,100 dots per inch.

The basic new approach of the present embodiment is generally represented in FIG. 18-1. This figure illustrates that the system presently described is not limited to the use of a PLZT modulator as described above. Block 454 represents any system capable of producing a plurality of light beams, substantially parallel and individually controllable. Examples are LED arrays, acousto-optic cells, as well as the optical system shown in FIG. 18-2.

Unit 452 contains an adjustable image rotator such as rotatable dove prism to adjust the orientation of the images of the light segments such as 205′, projected along line 245 to the photosensitive surface on the drum. The unit 452 also may contain an adjustable afocal zoom system capable of changing the resolution of the machine on demand.

The image-forming optical system mounted on the carriage 246 moves in a direction parallel to the axis 391 of drum 380, in the direction of the arrow 425, during the composition of a page. The carriage can be moved at a constant, substantially uniform speed, or can be stepped at the end of each sweep, as it will be explained below. Drum 380 is attached to shaft 373 which is mounted on bearings (not shown). The drum is rotated continuously by a motor (not shown) through a gear 375. The drum encoder 381 continuously produces rotational drum position codes at the same time as carriage 246, in cooperation with grating 428, which produces carriage position codes as explained above in connection with FIGS. 15 and 17.

In the embodiment of FIG. 18-1, individual "wide-brush" sweeps are shown at 315-1 to 315-6. To illustrate the operation further, groups of words are shown in each sweep area or band. For example, sweep 315-1 contains one line of words as well as two lines of smaller characters. In the bands 315-2 and 315-3, several words are shown.

Large characters requiring several revolutions of the drum to complete are shown on bands 315-4 to 315-6. In the example shown in FIG. 18-1, only bands 315-4 and 315-4 have been exposed to the image forming optics, as shown by the position of the carriage 246. The following band will receive character images during the next revolution of the drum to complete the word "LARGE PO . . . " which requires three consecutive revolutions.

In FIG. 21, the light sensitive material, film or plate, is shown at 389. A space or gap represented by angle 385 (and by area 303 in FIG. 18-1) may be utilized to facilitate the attachment of sensitive material to the drum, and also to provide sufficient time to move the carriage 246 in the step-stop mode between successive drum revolutions.

The present aspect of the invention can be utilized in conjunction with the optical and character generator system illustrated and described in co-pending application Ser. No. 800,519, with slight modifications as shown in FIG. 18-2. This Figure differs from FIG. 1 in that the ribbon of light beams entering traveling lens 242 is rotated by ninety degrees so that its width lies in a horizontal plane rater than in a vertical plane, as defined above. This change can be obtained by several different means. In FIG. 18-2 the elongated ribbon-like light bundle is rotated ninety degrees by rotating cylindrical lenses 224′, 226′, 234′ and 232′ by ninety degrees around axis 209 or 229. Crossed polarizers 27′ and 230′ also may be rotated ninety degrees. The reference number of all of the components which are so rotated are identified by a "prime" sign to distinguish them from the similar components of FIG. 1. Modulator assembly 228′ also has been rotated ninety degrees, as compared to modulator 228 of FIG. 1 as shown in FIG. 18-2. Thus, through these changes, the orientation of emerging columnar modulated light rays is as schematically shown at 205′ rather than in the orthogonal position shown at 205 in FIG. 1. The vertical image of the column of elementary light control areas has now become a horizontal image.

The operation of the section of the machine having identical components in FIGS. 18-1 and 18-2 is the same. As shown in FIGS. 18-2, a "wide brush" sweep of images is produced for each revolution of drum 380. These sweeps or bands should be parallel and perpendicular to the axis of rotation of the drum and should be contiguous to a high degree of accuracy in order to avoid objectionable gaps or overlapping between consecutive bands. This is obtained by synchronization between the rotation of the drum and the movement of the carriage, if it is in continuous motion, or by accurately stepping the carriage during the passage of blank area 303 (FIG. 18-1) or angle 385 (FIG. 21).

Figures 1, 20:
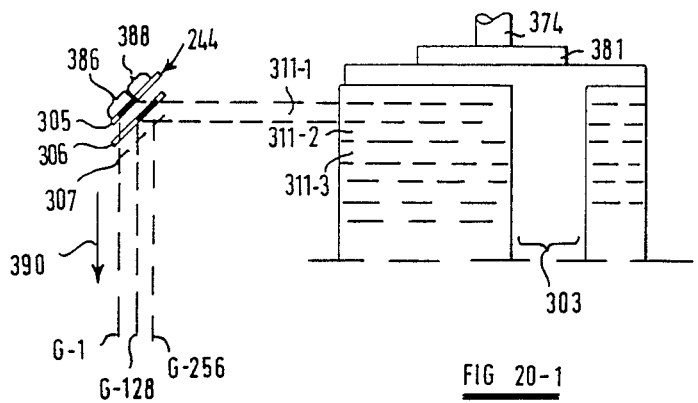
Figures 2, 20:
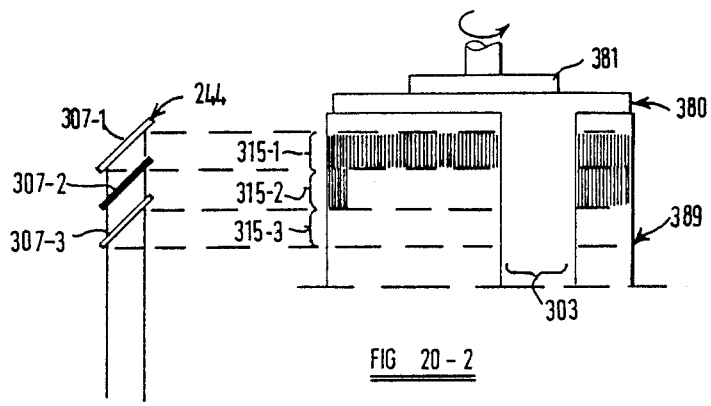
Figures 3, 20:
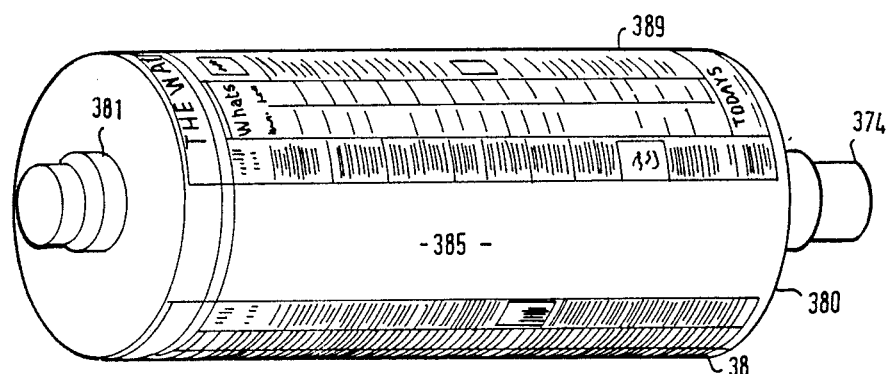

The position detector of the carriage is sufficiently accurate to transfer to the controlling circuit any slight deviation from its desired position caused, for example, by vibrations in the mode of operation in which the carriage is stepped. In this case, some gates are kept in reserve to be utilized to correct any temporary error in the position of the carriage. This is obtained by moving the horizontal image of the row of gates to the right or to the left by increments of 20 microns. FIG. 20-2 illustrates this mode of operation.

A high degree of accuracy in the position of the carriage is obtained by the arrangement shown in FIGS. 22 and 23. These Figures show the use of a differential photocell 500 and a light source 52 operating with the grating strip 428 and accurately detecting the position of the carriage and feeding this information to the gate selection electronics 504.

In FIG. 20-2, the different bands swept during each rotation of drum 380 are shown at 315-1 to 315-3 and the "clear" zone at 303. At the beginning of a page, the carriage mirror 244 is at position 307-1 and the first projection sweep occurs as soon as zone 303 has crossed the projection area (illustrated by line 245 of FIG. 1). At the end of the first active turn of the drum during which character images are projected, which occurs when zoom 303 enter the projection area, the carriage is stepped one band-width so that its mirror moves to position 307-2, ready to start imaging the second sweep, as soon as zone 303 has cleared the projection area. The gradual filling of the second band with images (represented by a series of vertical lines) proceeds as shown, while the mirror remains stationary at 307-2. Then, after zone 303 has again crossed the projection area, the carriage mirror will move to position 307-3, ready for the third sweep, and so on.

In the other operating mode, in which the carriage is in continuous motion during the composition of a line, each consecutive line or sweep is maintained parallel to each other and perpendicular to the drum axis by the operation of the "gate-shift" compensating system described earlier. For example, the schematic representation of the formation of successive lines is shown in FIGS. 19 and 20-1. At the beginning of the composition of a page, carriage mirror 244 (FIGS. 1, 18-1 and 18-2) is located at position 305. The mirror 244 is continuously moving in the direction shown by arrow 390 in FIG. 20-1 while the drum is spinning. At the very beginning of the line, gate images that are in the "energizable" position are projected by area 386 of the mirror. As the mirror moves "down", in the direction of arrow 390, the energizable gates are gradually shifted toward position 388 of the mirror so that, at the end of the first sweep, section 386 represents inactive gates while section 388 represents the surface of the mirror used for the projection of the last images of this first sweep.

After gap 303 has crossed the "projection line" (shown at 245 in FIG. 21) the projection of the second line will begin. At his point, certain gates of the gates array are selected which are the same as at the beginning of the first line, and also are projected by the same area 386 of the mirror, which now is at position 306. Again, as the drum rotates and the carriage moves, active gates are gradually shifted to compensate for the simultaneous displacements of the moving components so that, at the end of the second line, it will be mirror area 388 that will be used until the beginning of the third line, which occurs after the mirror reaches position 307, when the active surface (corresponding to active gates) will again move from area 388 to area 386, and so on, until a complete page (or pre-determined part of a page) has been projected, at which time the carriage unit 246 (FIG. 18-1) is returned home, the plate material is changed or the surface of the (selenium) drum is otherwise prepared for a new page. The different lines or wide-brush sweeps are shown at 311-1, 311-2 and 311-3 in FIG. 20-1.

Corrections can be achieved by the software embodiment of the invention described above and shown in FIG. 8A.

FIG. 19 further illustrates the operation of the present embodiment. The image of the contiguous elementary light gate row is shown at 384, at the beginning of a sweep, and at 384' at the end of a sweep. The active light controlling elements are shown at 386 at the beginning of a sweep, and at 388 at the end of a sweep. The row 384 may comprise 256 elements, but no more than one group of them is utilized during part of one sweep. The other ones, such as those located on the left-hand side of 386, as shown in FIG. 19, are compensating elements gradually activated as the drum rotates. The group located on the right side could be used in reverse, backwards operation. Arrow 392 represents the direction of the carriage displacement and arrow 390 the direction of rotation of the drum. Letters a and b and partial letter "A", etc., illustrate the formation of images in a single sweep. As it is shown in FIG. 20-1, the alternative in which the optical carriage is continuously moving necessitates the use of one of the compensating systems described above. But the method just described, although it necessitates a reduction of the active number of light elements, insures a smoother operation.

A particularly advantageous embodiment is shown in FIG. 20-3 which shows a plate 389 for printing full newspaper page produced with only one displacement of the carriage 246 in a direction parallel to the axis of the drum 380.

In the embodiment of FIG. 20-3, by way of example, the diameter of the drum 380 is 7", and its length is approximately 23". The newspaper page (e.g., one page of the "Wall Street Journal") is approximately 15" wide (including margins) by 22½" long. The gap 385 between lateral edges is approximately 7". The weight of the carriage 246 is only approximately 75 grams or 2½ ounces, and thus can be started and stopped quickly. The gates array has 256 gates, and a resolution of approximately 1,200 lines per inch is selected.

The carriage 246 is driven by a servo-motor with a drive mechanism of the type described in the co-pending application Ser. No. 800,519 in a stop-start mode to provide accurate locations for successive bands of characters and graphic matter on the drum. The carriage 246 requires about 30 to 35 milliseconds (including settling time) to move from one band-forming position to the next.

The drum 380 is rotated continuously at a speed of 3.5 revolutions per second (210 R.P.M.) at this speed, the gap 385 provides around 90 milliseconds in which the carriage can change positions, thus providing more than ample time for the shift.

This arrangement provides a capability of composing around 600 newspaper lines of 8-point, 11 pica text per minute; or 300 characters per second. A full newspaper page can be composed in less than one minute.

The optical system is capable of handling such extremely long distances as the 23" length of the drum in part because the carriage travels in converging collimated rays which are produced in the manner described in the above-identified co-pending patent application. The optics are dimensioned so that the light rays converge to a point about half-way between the ends of the drum. This minimizes vignetting and other problems which previously made such great distances of travel impractical or impossible.

The light weight of the carriage 246 helps to enable the composer to operate at such a high speed. Moreover, the high resolution provided by the machine makes it possible to reproduce photographs and other graphic matter using the same strokes as those used to compose the characters.

In another embodiment, the drum diameter is increased to 14", and the drum speed is lowered to 1.75 R.P.S. (105 R.P.M.). This makes it possible to compose a whole double newspaper page on one pass of the carriage 246. That double page can be folded to form two pages of a newspaper. When printed on both sides, it forms four newspaper pages.

The printing plate 389 attached to the drum 380 advantageously can be a zinc-oxide coated plate, or can be photographic film or paper to be used in making a metal printing plate.

It is apparent from the foregoing that the continuously-rotating drum form of the invention has several advantages not previously mentioned. By using the lightweight carriage 246 for band-spacing, the need for moving the more massive film or drum is avoided, thus enabling stop-start motion without any significant diminution of composing speed. Moreover, this can be accomplished with the use of relatively low drum speeds, thus avoiding high-speed balancing and other problems. In fact, within the limitations of the electronic circuitry, the drum speeds mentioned above can be increased significantly, thus even further increasing the composing speed.

In all embodiments of the invention, rapid changing of fonts is possible. For example, four or more fonts are stored at one time in RAM, and twenty or more on a floppy disc. Two hundred or more can be stored on a 10 Megabyte Winchester disc. Each font includes up to 256 characters and/or signs.

In the alternative embodiment shown in FIGS. 18-3 and 19', the character images produced by the parallel horizontal "ribbon" of light rays are rotated ninety degrees by the character-forming electronics as compared to the optical rotation of FIG. 18-1. The length of drum 380 represents, in this embodiment, the *width* of a page and the periphery of the drum the *length* of the page, plus the "dead zone" 385 of FIG. 21.

Each circular band produced by the wide brush during one drum revolution contains characters belonging to different lines of text. The continuous rotation of the drum is used to space characters according to their height plus interline spacing, if any. But, as in the previous embodiment of FIG. 18-1, the carriage traverses the length of the drum only once per page. As described before, the motion of the carriage can be either continuous or step by step, each step being generally equal to the width of the band or a wide brush. The present alternative makes it possible to decrease the length of the drum (at the expense of its diameter) and consequently the total travel of the carriage, but at the expense of more electronic storage and manipulation.

In the preceding description, the word "film" encompasses any photosensitive medium, including, for example, silver halide paper or film, zinc oxide paper or plate, and selenium-covered material in any form. By "scan line" we mean a very thin line of the order of 0.025 to 0.050 mm-0.001 to 0.002 inch, traversing the film from one margin to the other or the beginning of a column of text or graphics from one end to the other. By "text line" we mean one line of text, usually comprised of alphanumeric characters. By "multiple scan lines" we refer to a multiplicity of individual scan lines, independently modulated and emerging substantially simultaneously from the segmented light shutter or light-gates modulating unit and traversing the film in one single sweep. Depending on the number of individual scan lines, the sweep is also referred to as a "narrow brush" or "wide brush". The word "beam" generally means a bundle of light rays.

It should be understood that in all embodiments of the invention in which the film and carriage 246 are moved simultaneously during composition, the movements are to be synchronized. This can be done by the use of servo-motors and control circuits which compare the positions of the two continuously and make appropriate corrections to the carriage position during composition.

The above description of the invention is intended to be illustrative and not limiting. Various changes or modifications in the embodiments described may occur to those skilled in the art and these can be made without departing from the spirit or scope of the invention.

We claim:

1. A photcomposing device comprising, in combination. means for forming a laser brush capable of being moved relative to a photosensitive surface to form images thereon, motion creating means for creating continuous relative motion between said laser brush-forming means and said photosensitive surface in order to space arrays of images created by one pass of said brush over said surface relative to arrays of images created by another pass of said brush over said surface, correcting means for correcting the skewing of images on said surface caused by the continuous simultaneous motion of said brush and said surface relative to one another, said laser brush comprising an elongated array of individually controllable separate laser beams, each being capable of forming a spot on said surface, said correcting means including selecting means utilizing electrical signals for selecting the ones of said separate beams which are utilized to form each given image segment so as to provide the correction.

2. A device as in claim 1 in which said selecting means comprising means for shifting the address in memory from which an instruction for controlling each of said separate laser beams is retrieved.

3. A device as in claim 1 in which said brush-forming means comprises a laser beam source, and an array of individually-electrically controllable light gates intercepting said beams, said selecting means comprising means for enabling only those gates within a given zone, and shifting the position of said zone in said array.

4. A device as in claim 1 including means for detecting the instantaneous positions of said photosensitive surface and said brush-forming means and producing corresponding signals, and means for utilizing said signals to control said selection means.

5. A photocomposing device as in claim 1 in which said laser beam source is adapted to form a thin, elongated polarized light beam, and to project said light beam onto a linear array of light gates, said array comprising a column of coterminous, electrical signal-responsive individually-controllable elementary areas located on a common substrate, each area being adapted to change the polarization of the light it receives independently of each other area, means for selectively signalling each of said areas, and polarizing filter means for receiving light from said array.

6. A device as in claim 5 including a stationary collimating optical system for receiving light rays emerging from said filter means, means for directing the collimated light rays emerging from said collimating optical system to a imaging second optical system to form an image of said array, said motion creating means including means for continuously moving said second optical system at a substantially constant speed along a straight path in a direction transverse to the direction of said image of said array and parallel to said photosensitive surface, so that said image of said array is caused to sweep across the width of said surface, said motion creating means also including means for continuously moving said photosensitive surface at a substantially constant speed in a direction perpendicular to said path, and said electronic selection means being adapted to change the position of said image on said photosensitive surface so that said image is moved lengthwise in synchronism with the displacement of said surface to compensate for its continuous motion so that the successive adjacent of said array, spaced by the motion of said second optical system, remain lengthwise along a path perpendicular to the edge of said surface.

7. A photocomposing device comprising, in combination, means for forming a laser brush capable of being moved relative to a photosensitive surface to form images thereon, means for creating continuous relative motion between said laser brush-forming means and said photosensitive surface in order to space arrays of images created by one pass of said brush over said surface relative to arrays of images created by another pass of said brush over said surface, correcting means for correcting the skewing images on said surface caused by the continuous simultaneous motion of said brush and said surface relative to one another, said correcting means including detecting means for detecting the instantaneous positions of said photosensitive surface and said brush and producing corresponding signals, and means controlled by said signals for gradually changing the positions of images formed by said brush-forming means to compensate for said skew.

8. A device as in claim 7 including support means for a second photosensitive surface, said reflector being pivotable to deflect laser beams alternatively to said second or said first photosensitive surface.

9. A device according to claim 7 in which said motion creating means includes a movable carriage for moving said laser brush, light detector means, a fixed grating, one of the grating and detector means being mounted to travel with said carriage and the other being fixed, said detector means being adapted to generate pulses indicative of the instantaneous position of said carriage.

10. A device according to claim 9 in which said grating is provided with additional marks, and a separate pulse generator means in for generating start-of-a-scan and end-of-a-scan signals.

11. A device as in claim 7 in which said motion creating means includes first drive means for driving said surface in one direction and second drive means for sweeping said laser brush across said surface in a transverse direction, the relative speeds creating by said first and second drive means being such that at the end of each active transverse sweep of said laser brush, said surface has not moved far enough to ensure the accurate junction of consecutive sweeps, the time required for the laser brush to start a new sweep across said surface being equal to the additional time required by said surface to reach its new location for an accurate junction.

12. A device as in claim 7 including an afocal optical system in order to change the image size projected on said photosensitive surface.

13. A device as in claim 12 including means for using the adjustment of said afocal zoom to control said motion creating means so that greater or lesser time is allowed between consecutive modulations of the laser brush beams and between consecutive transverse sweeps of said laser brush over said surface.

14. A device as in claim 7 in which lines of characters are formed in continuous bands over which said laser brush sweeps, parts of some of said characters gradually migrating from one of said bands to the next one under the control of said correcting means.

15. A device as in claim 7 in which said motion creating means includes a pivotable reflector for scanning said laser brush over said surface.

16. A device as in claim 7 in which said motion creating means includes a rotatable drum bearing said photosensitive surface, means for rotating said drum continuously and means for moving said laser brush axially of said drum.

17. A device as in claim 7 in which said motion creating means includes an optical micrometer for scanning said laser brush over said surface.

18. A photocomposing method comprising the steps of:
(a) continuously moving a laser brush and a photosensitive surface relative to one another to form and position images on said surface,
(b) detecting the instantaneous positions of said laser brush and said surface and producing corresponding position-indicating signals,
(c) utilizing said signals to control means for adjusting the positions of images formed by said laser brush on said surface to correct for the skew of said images caused by the simultaneous motion of both said brush and said surface.

19. A method as in claim 18 in which the laser beam includes a linear array of individually controllable laser beams, and said position adjusting step includes shifting of the ones of the beams in said array which are selected to form a given image segment.

20. A method as in claim 19 in which said shifting step includes storing instructions in computer memory and retrieving said instructions in synchronism with the sweep motion.

21. A method as in claim 18 in which the position adjusting step includes swinging a pivotable deflector.

22. A photocomposing device comprising, in combination, a laser beam source, modulating means for modulating said laser beam source to form a laser brush an to form graphic images on said surface, a rotatable polygonal reflector and means for rotating said reflector, said reflector being positioned so that each facet of said reflector intercepts said laser brush beams and, when rotated, sweeps said beams over said photosenistive surface, means for moving said photosensitive surface continuously in a direction transverse to the direction in which said beams are swept over said surface, and correcting means for correcting the skew of images due to the simultaneous motion of said surface and said beams, said correcting means including detecting means for detecting the instantaneous positions of said photosensitive surface and said brush and producing corresponding signals, and means controlled by said signals for gradually changing the positions of images formed by said brush-forming means to compensate for said skew.

23. A device as in claim 22 in which said modulating means comprises a monolithic linear light gate array composed of closely spaces, separately controllably areas of PLZT material on a substrate, with at least one separate electrode for each area, means for directing a flattened laser beam at said array, and polarization means for causing light passing through selected ones of said light gates to be strongly attenuated while transmitting light from others of said areas, in accordance with a predetermined pattern for forming consecutive line segments to form images when said laser brush is scanned across said surface.

24. A device as in claim 22 in which said laser brush comprises an elongated array of individually controllable separate laser beams, each being capable of forming a spot on said surface, and modulating means including a linear light gate array modulating said laser beam to form separate beams, said correcting means including selecting means responsive to electrical signals for selecting which of said gates will modulate the beams forming each image segment so as to effectively shift the position of the resulting image.

25. A photocomposing method comprising the steps of:
    (a) continuously moving a laser brush and a photosensitive surface relatively to one another to form and position images on said surface,
    (b) detecting the instantaneous positions of said laser brush and said surface and producing corresponding position-indicating signals,
    (c) utilizing said signals to control means for adjusting the positions of images formed by said laser brush on said surface to correct for the skew of said images caused by the simultaneous motion of both said brush and said surface;
    (d) said step of continuously moving said laser brush and surface including the step of scanning said laser brush across said surface by means of a pivotable reflector.

26. A method as in claim 25 in which said scanning step comprises rotating a polygonal mirror in the paths of the light beams forming said brush.

27. A method as in claim 25 in which the relative speeds of the image projected onto said surface by said pivotable reflector and said continuously moving surface are selected so that at the end of each active transverse sweep said surface has not moved far enough to ensure accurate junction of consecutive sweeps, and utilizing the additional time required by said surface to reach its new location for the pivotable reflector to reach the starting position for a new sweep.

* * * * *